(12) United States Patent
Rajagopalan

(10) Patent No.: US 9,746,894 B1
(45) Date of Patent: Aug. 29, 2017

(54) DYNAMIC THRESHOLD VOLTAGE COMPENSATION

(71) Applicant: Amazon Technologies, Inc., Seattle, WA (US)

(72) Inventor: Vigneswaran Rajagopalan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 14/554,786

(22) Filed: Nov. 26, 2014

(51) Int. Cl.
*G06F 1/00* (2006.01)
*H02J 7/00* (2006.01)
*G06F 1/28* (2006.01)

(52) U.S. Cl.
CPC . *G06F 1/28* (2013.01); *H02J 7/00* (2013.01)

(58) Field of Classification Search
CPC .......................................................... G06F 1/28
See application file for complete search history.

(56) References Cited

U.S. PATENT DOCUMENTS

| 2007/0194791 | A1* | 8/2007 | Huang | G01R 31/3662 324/430 |
|---|---|---|---|---|
| 2007/0257642 | A1* | 11/2007 | Xiao | H02J 7/0026 320/134 |
| 2008/0309289 | A1* | 12/2008 | White | H02J 7/0063 320/136 |
| 2010/0156351 | A1* | 6/2010 | Ugaji | G01R 31/3679 320/132 |
| 2011/0112781 | A1* | 5/2011 | Anderson | G01R 31/3679 702/63 |
| 2011/0320835 | A1* | 12/2011 | Browning | G06F 1/3203 713/320 |
| 2012/0166847 | A1* | 6/2012 | Noda | H01M 10/482 713/323 |
| 2013/0091083 | A1* | 4/2013 | Frisch | G06N 99/005 706/14 |
| 2015/0121112 | A1* | 4/2015 | Wei | H04W 52/0264 713/324 |
| 2016/0142054 | A1* | 5/2016 | Mojumder | G06F 1/3206 327/333 |

OTHER PUBLICATIONS

Lee, Inhee, et al. "Low Power Battery Supervisory Circuit with Adaptive Battery Health Monitor." University of Michigan, Ann Arbor, MI. Jun. 13, 2014. (2 pgs.).
Woodbank Communications. "Battery and Energy Technologies: Batter Life (and Death)." Chester, United Kingdom. 2005. (9 pgs.).
Davis, Eddie, et al. "Internal Ohmic Measurements and Their Relationship to Battery Capacity—EPRI's Ongoing Technology Evaluation." Edan Engineering Corporation, Vancouver, WA. 2002. (10 pgs.).

* cited by examiner

*Primary Examiner* — Nitin Patel
*Assistant Examiner* — Kevin Stewart
(74) *Attorney, Agent, or Firm* — Eversheds Sutherland (US) LLP

(57) ABSTRACT

Systems, devices, methods, computer-readable media, techniques, and methodologies are disclosed for increasing efficiency in power management for user devices. In some embodiments, a system voltage and battery voltage of a user device may be monitored and stored. The system voltage and battery voltage may be analyzed, and a system minimum voltage threshold for a user device may be modified based on the analysis of the measurements.

20 Claims, 4 Drawing Sheets

DYNAMIC THRESHOLD VOLTAGE COMPENSATION

BACKGROUND

User devices have increasingly powerful batteries that keep the user devices powered for several days. However, different factors may affect the ability of the user device to remain charged and functional. Factors such as aging of the internal components of a user device and environmental conditions (e.g., humidity, temperature levels, etc.) in which the user device is operated may have an effect on the voltage of the user device and its ability to remain powered. Some user devices may encounter a battery bounce problem, in which a device may momentarily shut down or power down and reboot when a low battery threshold has been met. This may occur when a requested action requires a heavy load or requires more voltage, which would cause the voltage of the battery to drop below the minimum voltage threshold of the user device causing the user device to power down or reboot. Battery bounce problems may occur more frequently as the user device ages or is affected by environmental conditions.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
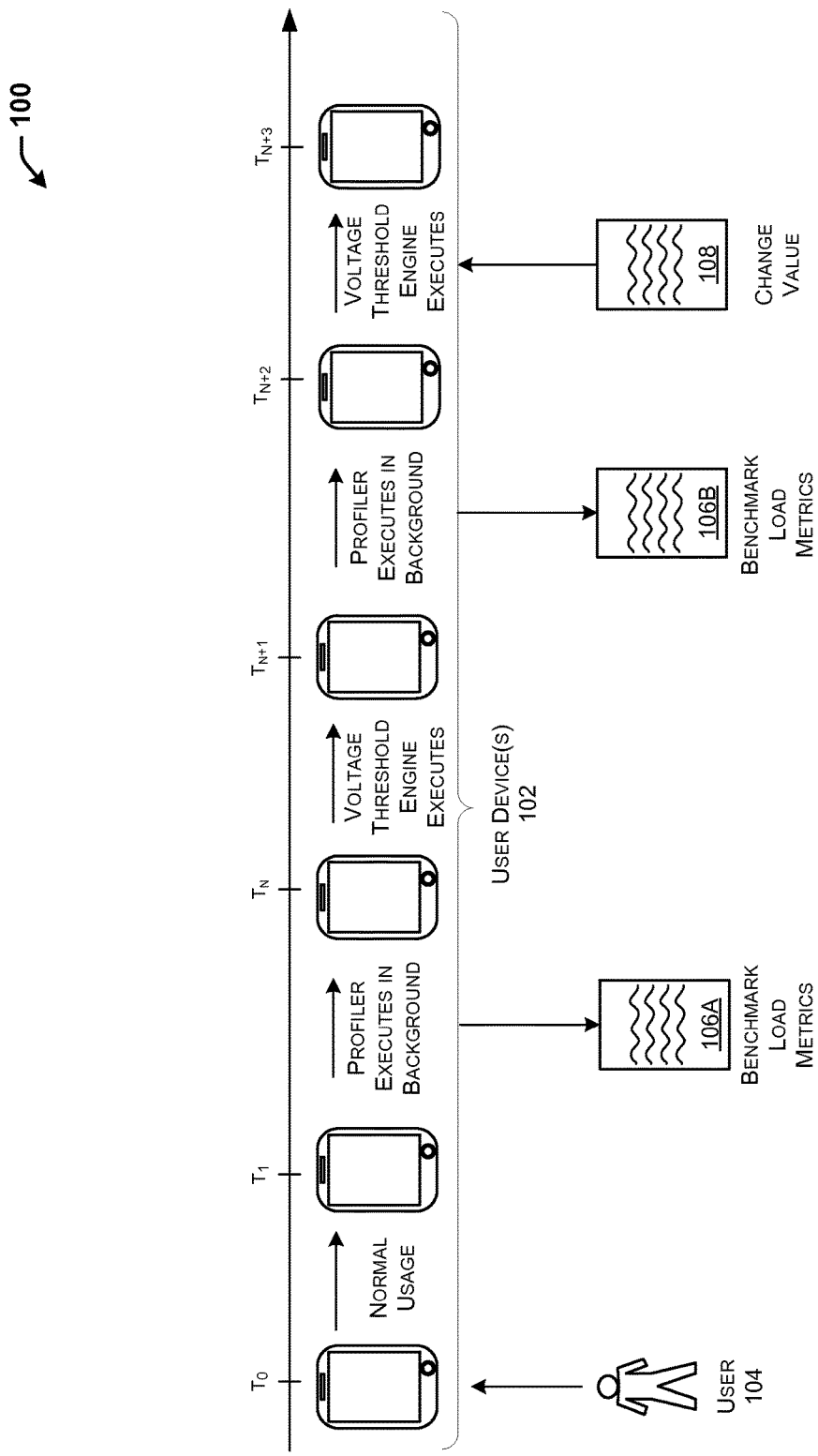
FIG. 1 is a schematic system and data flow diagram illustrating the dynamic threshold voltage compensation for user devices in accordance with one or more example embodiments of the disclosure.

This disclosure relates to, among other things, systems, devices, methods, computer-readable media, techniques, and methodologies for dynamic threshold voltage compensation for user devices. The dynamic threshold voltage compensation may be used to alleviate the effects of battery bounce on user devices. By reducing the number of battery bounce incidents, where a device may momentarily shut down or power down and reboot when a low battery threshold has been met, devices may be utilized for longer than their expected usage life.

In some embodiments, the internal components of a user device may erode due to component aging or as a result of environmental factors (e.g., humidity, extreme temperatures, etc.). For example, the resistance of the battery of a user device, the resistance of the battery connector-contact, trace resistance, the contact resistance of solder balls, and the like, may increase over time, causing the series impedance to increase.

In some embodiments, a power management integrated circuit (PMIC) may monitor the internal system voltage and battery voltage of a user device. In some embodiments, benchmark load metrics may be generated by a load profiler module or application. The load profiler may be a module or application with a predictable resource usage pattern, where the module or application will draw a pre-set current (e.g., a fixed load) from a battery of a user device. The load profiler may generate a set of benchmark load metrics by measuring, for instance, a system voltage value and a battery voltage value, as it draws the current from the battery. The load profiler may execute in the background of the user device. The load profiler may generate the benchmark load metrics and store the metrics in the data storage of the user device or transmit the data to a remote server or datastore.

In some embodiments, the benchmark load metrics may be processed to identify a system voltage value and a battery voltage value as a fixed load is drawn from the battery. The system voltage value and battery voltage value may be used to calculate a change value by which to adjust a system minimum voltage value of a user device. The system minimum voltage value may be the voltage necessary to keep the user device powered. In some embodiments, the change value may be used to determine whether the system minimum voltage value of a device should be adjusted. In some embodiments, the change value may be compared to a system minimum voltage threshold value to determine whether the system minimum voltage value of the device should be adjusted. The system minimum voltage threshold value may be indicative of the lowest value the system minimum voltage value may be set. The system minimum voltage threshold value may be determined based on one or more peripheral internal components of the user device.

In some embodiments, the benchmark load metrics may be generated at periodic time intervals (e.g. monthly, weekly, etc.). In some embodiments, the periodic time intervals may be enforced once a periodic time interval measured from the date of manufacture of the user device has been exceeded. For example, benchmark load metrics may not be generated unless a device has been in use for a year. Once the user device has been active for a year, then the benchmark load metrics may be generated weekly to identify any potential battery bounce problems. In some embodiments, based on the generated benchmark load metrics, the fixed intervals may be modified, either increasing or decreasing the intervals depending on the change in values measured in the benchmark load metrics.

In some embodiments, previously stored benchmark load metrics may be retrieved and compared to newly generated benchmark load metrics. For example, metrics generated today may be compared to benchmark load metrics that were generated the previous week. The two sets of metrics may be analyzed to determine whether the system voltage value or battery voltage value has changed over the week interval. In some embodiments, the change value may be calculated based on the difference between the system voltage value and the battery voltage value of the first data set and the system voltage and battery voltage of the second data set.

In some embodiments, a system voltage value and battery voltage value may be monitored directly by the PMIC. The PMIC may monitor the system voltage value and the battery voltage value and generate a change value. The PMIC may obtain the system minimum voltage value (e.g., the minimum voltage necessary to power the user device) and the system minimum voltage threshold value (e.g., the lowest value to which the system minimum voltage value may be set). In some embodiments, the system minimum voltage value may be modified based on the analysis.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments

FIG. 1 is a schematic system and data flow diagram 100 illustrating the dynamic threshold voltage compensation for user devices 102 in accordance with one or more example embodiments of the disclosure. In some embodiments, a user 104 may acquire a new user device 102. At time $T_0$, the user device 102 may be activated for the first time by the user 104. The user 104 may activate and use the user device 102 under normal conditions, such as making phone calls, browsing the Internet, taking photos, or other user device activity. In some embodiments, a user 104 may be able to operate the user device 102 for a periodic time interval (e.g., a year) prior to the user device 102 initiating dynamic threshold voltage compensation. Once the periodic time interval (e.g., $T_1$) has been exceeded, the user device 102 may initiate a voltage threshold engine to monitor the system voltage and battery voltage of the user device 102. The voltage threshold engine of a user device may initiate a profiler, which may execute in the background of the user device 102. The profiler may be an application with a known load profile (e.g., predictable pattern of resource usage). In some embodiments, the profiler may generate benchmark load metrics 106A, 106B (collectively 106) in response to a fixed electric current being drawn from the battery of the user device 102 through the internal components of the user device 102. The benchmark load metrics 106A may be analyzed to identify a system voltage value and a battery voltage value measured in response to the fixed load. At $T_N$, the voltage threshold engine may execute to determine whether a system minimum voltage value associated with the user device 102 needs to be modified. At $T_N$, the voltage threshold engine may determine, based on the benchmark load metric 106A measured at $T_1$ that the system minimum voltage value for the user device 102 does not need to be modified. The profiler and the voltage threshold engine may execute at fixed time intervals (e.g., monthly, weekly, daily, etc.). At the next fixed time interval ($T_{N+1}$), the profiler may generate a second set of benchmark load metrics 106B. At $T_{N+2}$, the voltage threshold engine may determine, based on analyzing the benchmark load metrics generated at $T_1$ and the benchmark load metrics generated at $T_{N+1}$, that the system minimum voltage value needs to be modified. In some embodiments, the voltage threshold engine may generate or calculate a change value based at least in part on the benchmark load metrics 106A, 106B. At $T_{N+3}$, the voltage threshold engine may modify the system minimum voltage value based at least in part on the generated change value 108.

Figure 2:
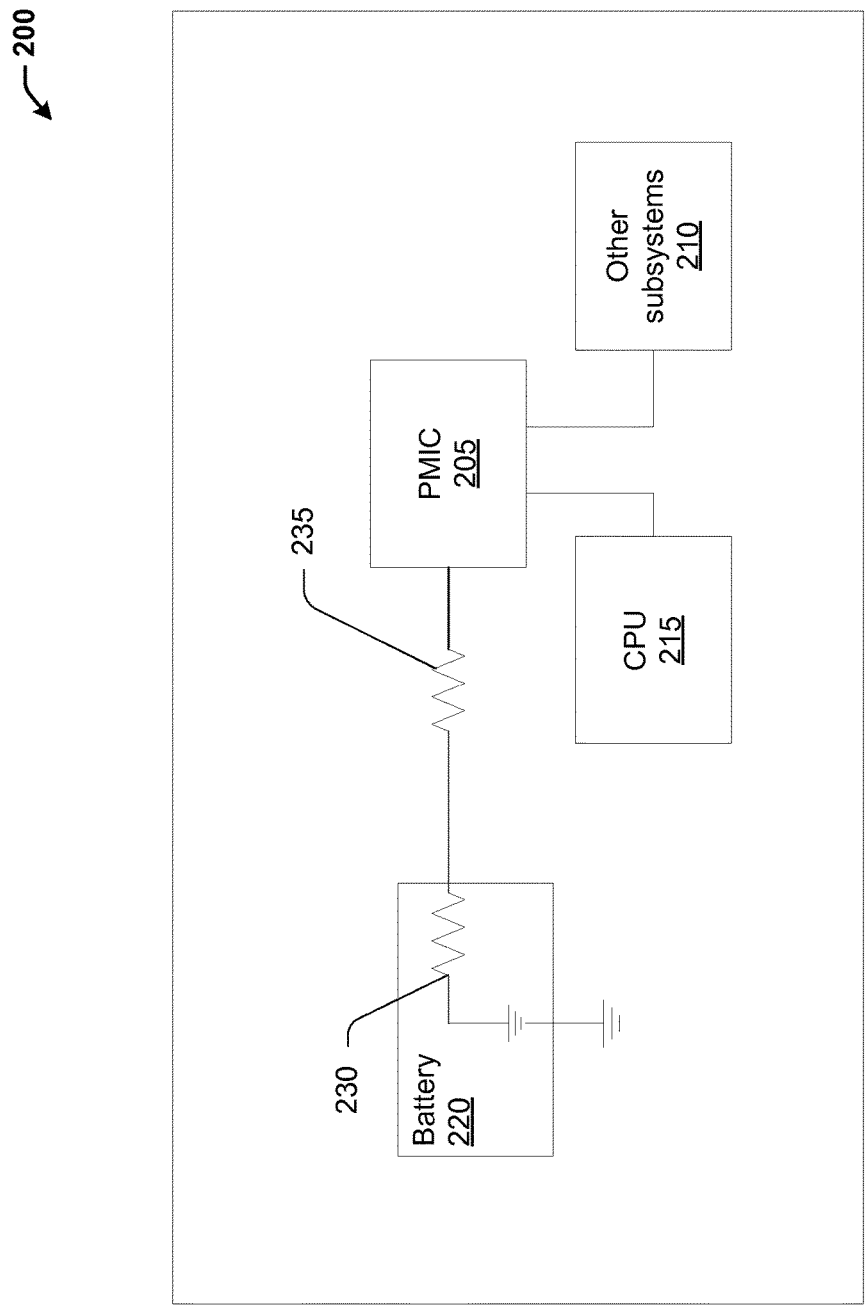
FIG. 2 is a schematic system and data flow diagram illustrating an example user device implementation in accordance with one or more example embodiments of the disclosure.

FIG. 2 is a schematic system and data flow diagrams illustrating an example user device implementation 200 in accordance with one or more example embodiments of the disclosure. The user device implementation 200 may include a power management integrated circuit (PMIC) 205, a central processing unit (CPU) 215, other subsystems 210, and a battery 220. Also depicted are the internal resistance 230 of the battery 220 and the battery connector-contact resistance 235. The internal resistance 230 of the battery 220 and the battery connector-contact resistance 235 may increase due to aging components or environmental factors. Such increased resistance may be captured or detected through the generation of benchmark load metrics. In some embodiments, a voltage threshold engine 420 (shown in FIG. 4) may be stored on the PMIC 205 or in the data storage of the user device 102. The voltage threshold engine 420 may initiate a profiler 418 to generate benchmark load metrics 106 based on drawing a fixed load from the battery 220 through the user device 102. In some embodiments, the system voltage may be measured as the input voltage of the PMIC 205 to ensure the value obtained for the system voltage represents the battery voltage as viewed by the PMIC 205.

In some embodiments, the PMIC 205 may be an integrated circuit, a system block in a system-on-a-chip device, or the like, for managing power requirements of the host system, such as the user device 102. In some embodiments, a PMIC 205 may include battery management, voltage regulation, and charging functions. It may include an analog to digital converter (ADC) to measure the system voltage value and the battery voltage value of the user device 102. In some embodiments, a PMIC 205 may include a low-dropout (LDO) regulator. An LDO may be a DC linear voltage regulator which may operate with small input-output differential voltage and may require a lower minimum operating voltage, higher efficiency of operation, and lower heat dissipation. In some embodiments, the PMIC 205 (e.g., the ADC of the PMIC) may facilitate the generation of benchmark load metrics 106 by obtaining measurements for a system voltage (VSYS) and battery voltage (VBAT). In some embodiments, the PMIC 205 may initiate and/or execute a profiler 418 (discussed in more detail in relation to FIG. 4) to generate the benchmark load metrics 106. The benchmark load metrics 106 may be generated by facilitating drawing a fixed load of electric current from the battery 220 through the internal components of the user device 102 (e.g., charger (not pictured), CPU, and the like). In some embodiments, the VBAT and VSYS may be measured in response to the fixed load. In some embodiments, the other subsystems 210 may include peripheral internal components of a user device, such as a WiFi amplifier component, a touchscreen controller, a backlight controller, and the like. Each peripheral internal component may have an associated required voltage necessary to power the component. In some embodiments, a system minimum voltage threshold value may be generated and/or updated using data associated with the required voltage of one or more peripheral internal components.

Illustrative Processes

Figure 3:
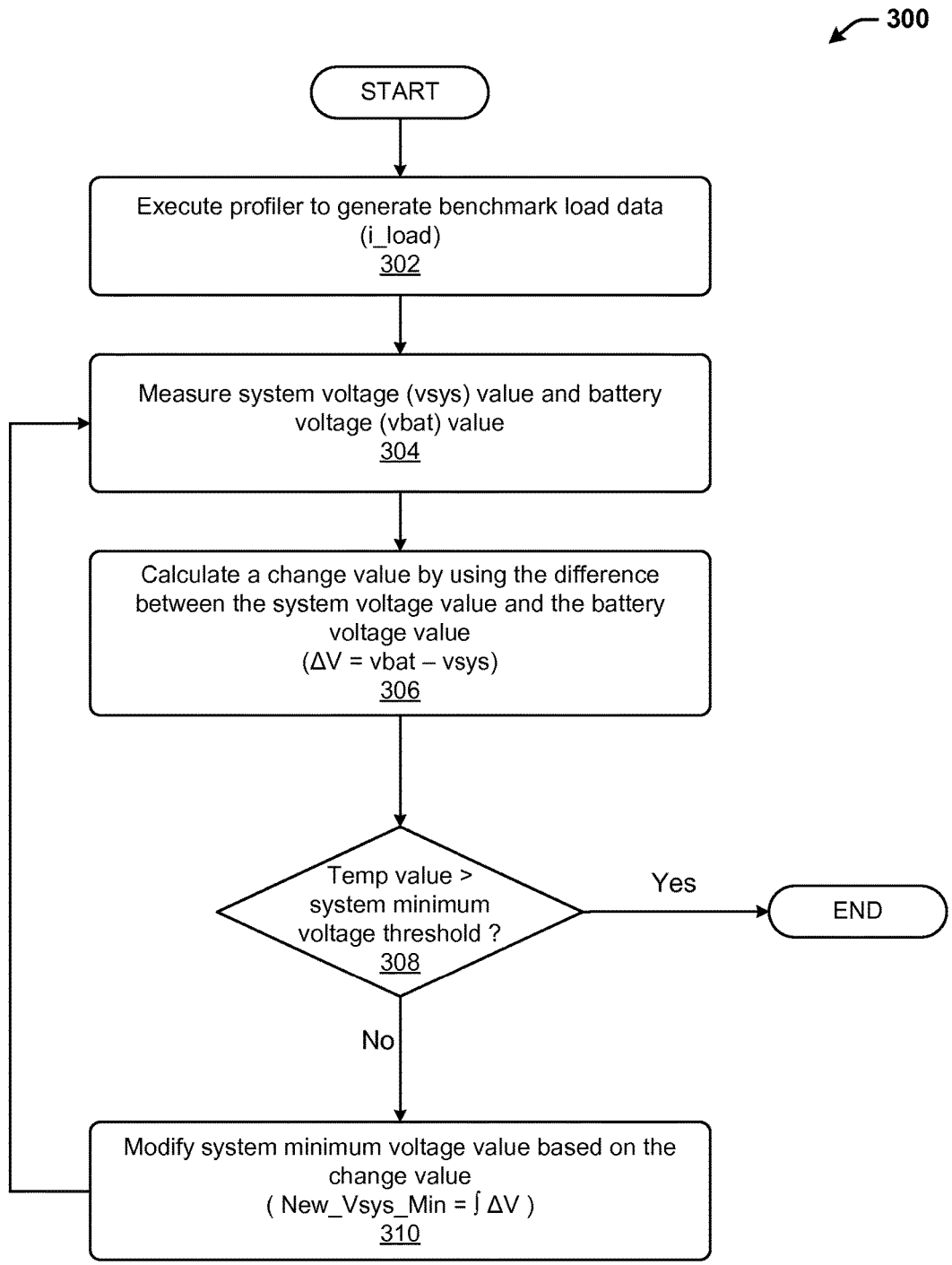
FIG. 3 is a process flow diagram of an illustrative method for dynamic threshold voltage compensation for user devices in accordance with one or more example embodiments of the disclosure.

FIG. 3 is a process flow diagram of an illustrative method for dynamic threshold voltage compensation for user devices 102 in accordance with one or more example embodiments of the disclosure. At block 302, a voltage threshold engine 420 may execute or initiate a profiler 418 to generate load data (e.g., i_load). The profiler 418 may generate benchmark load metrics 106 which may draw a pre-set current from the battery 220 of the user device 102 and measure a battery voltage value and a system voltage value. In some embodiments, the profiler 418 may be initiated by the voltage threshold engine 420 which may be stored on the PMIC 205 or in data storage. The profiler 418 may execute in the background of the user device 102. In some embodiments, the profiler 418 may be manually initiated by the user 104. In some embodiments, the profiler 418 may be executed at fixed intervals of time after a periodic time interval has been exceeded. For example, the periodic time interval may be specified by a user 104 or at the time of manufacture and may be set to be a specific duration (e.g., one year from the first activation of the user device 102). Once the pre-set threshold has been exceeded, the profiler 418 may execute at fixed time intervals (e.g., monthly, weekly, etc.). In some embodiments, the fixed time intervals may be specified by the user 104. In some embodiments, the fixed time interval may be modified based at least in part on the generated benchmark load metrics 106. For example, if benchmark load metrics 106 are generated on Oct. 1, 2014 and then again at Oct. 14, 2014 (e.g., every two weeks) and after analysis, there is no change in the two sets of metrics or the change in the metrics is minor (e.g., within a specified margin), then the fixed intervals may be modified to be every month, rather than every two weeks. Likewise, if benchmark load metrics 106 were generated on Oct. 1, 2014 and then again Nov. 1, 2014 and there has been a significant change in the generated metrics based on the same fixed load, then the interval may be modified to be weekly or daily. In some embodiments, the analysis may include comparing a current set of benchmark load metrics 106B with a previously generated set of benchmark load metrics 106A. For example, the voltage threshold engine 420 may generate a temporary value of the difference between a battery voltage of the benchmark load metrics 106A and a battery voltage of the benchmark load metrics 106B. The voltage threshold engine 420 may generate a second temporary value of the difference between a system voltage of the benchmark load metrics 106A and a system voltage of the benchmark load metrics 106B. The voltage threshold engine 420 may determine whether the first temporary value and the second temporary value exceed a change threshold. A change threshold may be a value indicating the maximum difference in values (e.g., the difference between battery voltages or system voltages) without increasing the interval between the generations of benchmark load metrics 106. For example, the change threshold may be set to 0.05V. If the first temporary value is 0.03V and the second value is 0.03V, then neither the first temporary value nor the second temporary value has exceeded the change threshold. In some embodiments, if the first temporary value and/or the second temporary value do not exceed the change threshold, then the time interval value may be increased (e.g., there is more time between the generation of benchmark load metrics 106). In some embodiments, if the first temporary value and/or the second temporary value do exceed the change threshold, then the time interval value may be decreased (e.g., there is less time between the generation of benchmark load metrics 106). In some embodiments, if the first temporary value and/or the second temporary value equal the change threshold, then the time interval value may be unchanged.

At block 304, the system voltage (VSYS) and battery voltage (VBAT) values may be measured and/or identified from the generated benchmark load metrics 106. In some embodiments, computer-executable instructions, code, or the like of a voltage threshold engine 420 (which will be described in more detail later in this disclosure in reference to FIG. 4) may process the benchmark load metrics 106 to identify a system voltage value and battery voltage value measured in response to the fixed load of the profiler 418. In some embodiments, the voltage threshold engine(s) 420 may directly measure and/or facilitate measurement by the profiler 418, the system voltage value and/or battery voltage value in response to the profiler drawing a pre-set current from the battery 220 of the user device 102. In some embodiments, the voltage threshold engine 420 may generate benchmark load metrics 106 and may store them in the data storage of the user device 102 or in a datastore.

At block 306, a change value 108 may be calculated by the voltage threshold engine 420 based on the system voltage value and the battery voltage value. In some embodiments, the change value 108 may be calculated by calculating the difference between the system voltage value and the battery voltage value of the user device as a fixed load (e.g., pre-set current) is drawn from the battery 220 of the user device 102 (e.g., $\Delta V=VBAT-VSYS$). In some embodiments, the change value 108 may be used to replace the current value of the system minimum voltage. In some embodiments, the change value 108 may be the value by which the current value of the system minimum voltage may be modified (e.g., increased by the change value 108, decreased by the change value 108, etc.). In some embodiments, the change value 108 may be the value used to look up a corresponding value in a pre-determined or pre-established data structure, such as a table. The corresponding value may be used to replace or modify the existing system minimum voltage threshold. In some embodiments, the change value 108 may be calculated using the system voltage value and the battery voltage value obtained via the benchmark load metrics 106 or direct measurements obtained via the PMIC 205 or the CPU 215. In some embodiments, the change value 108 may be calculated in accordance with one or more algorithms (e.g., calculating the difference between the system voltage and the battery voltage of the user device 102) used to determine an optimal minimum system voltage to alleviate any existing battery bounce incidents, where the device may unexpectedly shut down or power down and reboot when the system minimum voltage threshold has been exceeded due to a load draw by a component of the user device 102.

At block 308, the voltage threshold engine 420 may determine whether a system minimum voltage threshold value of the user device 102 has been exceeded. In some embodiments, the user device 102 may have a system minimum voltage threshold value, which indicates the lowest value to which the system minimum voltage value may be set. In some embodiments, the system minimum voltage threshold value may be generated based on data associated with one or more peripheral internal components of the user device 102. For example, a user device 102 may include different components (e.g., in other subsystems 210) that may require a minimum voltage to power up and function properly, such as a WiFi amplifier component, a touchscreen controller, a backlight controller, and the like. In some embodiments, the system minimum voltage threshold value may be set to be equal to the highest required voltage value of one peripheral internal components of the user device 102. If, for example, of the WiFi amplifier component, the touchscreen controller, and the backlight controller, the touchscreen controller has the highest required voltage of the peripherals, then the system minimum voltage threshold value may be set to be equal to the required voltage of the touchscreen controller.

In some embodiments, the voltage threshold engine 420 may calculate a temporary value where the system minimum voltage value is decreased by the change value. The temporary value would be representative of the new system minimum voltage value once it had been adjusted. The temporary value may then be compared to the system minimum voltage threshold value. If the temporary value is greater than the system minimum voltage threshold value, then the system minimum voltage threshold value may still be adjusted to the temporary value. However, if the temporary value is less than the system minimum voltage threshold value, then if the user device 102 were to have the system minimum voltage value changed to the temporary value, it would be unable to turn on because there would be insufficient voltage to supply enough power to the internal components of the user device 102. In some embodiments, if the temporary value is less than the system minimum voltage threshold value, then the change value may be changed to zero so that the system minimum voltage value will not be affected by the change value.

If at block 308, the temporary value is higher than the system minimum voltage threshold value, then at block 310, the system minimum voltage value may be modified based on the change value 108 (e.g., New_Vsys_Min=∫ΔV). In some embodiments, the voltage threshold engine(s) 420 may modify the system minimum voltage threshold based on the calculated change value 108. The system minimum voltage value may be modified by changing a value in the registry of the user device 102. After the system minimum voltage value has been modified, the method may proceed back to block 304.

If at block 308, the temporary value is less than the system minimum voltage threshold value, then the method may terminate. In some embodiments, the voltage threshold engine 420 may update the change value to zero, so that any modifications to the system minimum voltage value would not be affected by the change value. In some embodiments, if the system minimum voltage threshold value is greater than the temporary value, the battery 220 of the user device 102 may no longer be extended, and no further adjustments to the system minimum voltage value may be made. In some embodiments, if the system minimum voltage threshold value has been exceeded, the voltage threshold engine 420 may generate a notification or message. The notification or message may be indicative that the battery 220 may no longer be extended and may be presented to the user of the user device 102.

In some embodiments, the voltage threshold engine 420 may retrieve any and all benchmark load metrics 106 generated in association with the user device 102. The voltage threshold engine 420 may generate a report (e.g., table, graph, etc.) using the benchmark load metrics 106. For example, by plotting the metrics along a time plot, the report may illustrate the impact of the dynamic voltage compensation on the battery 220. In some embodiments, the data may include the intervals at which the benchmark load metrics 106 were measured, the values for each set of benchmark load metrics 106, the data associated with the profiler 418, and the like.

Illustrative Device Architecture

Figure 4:
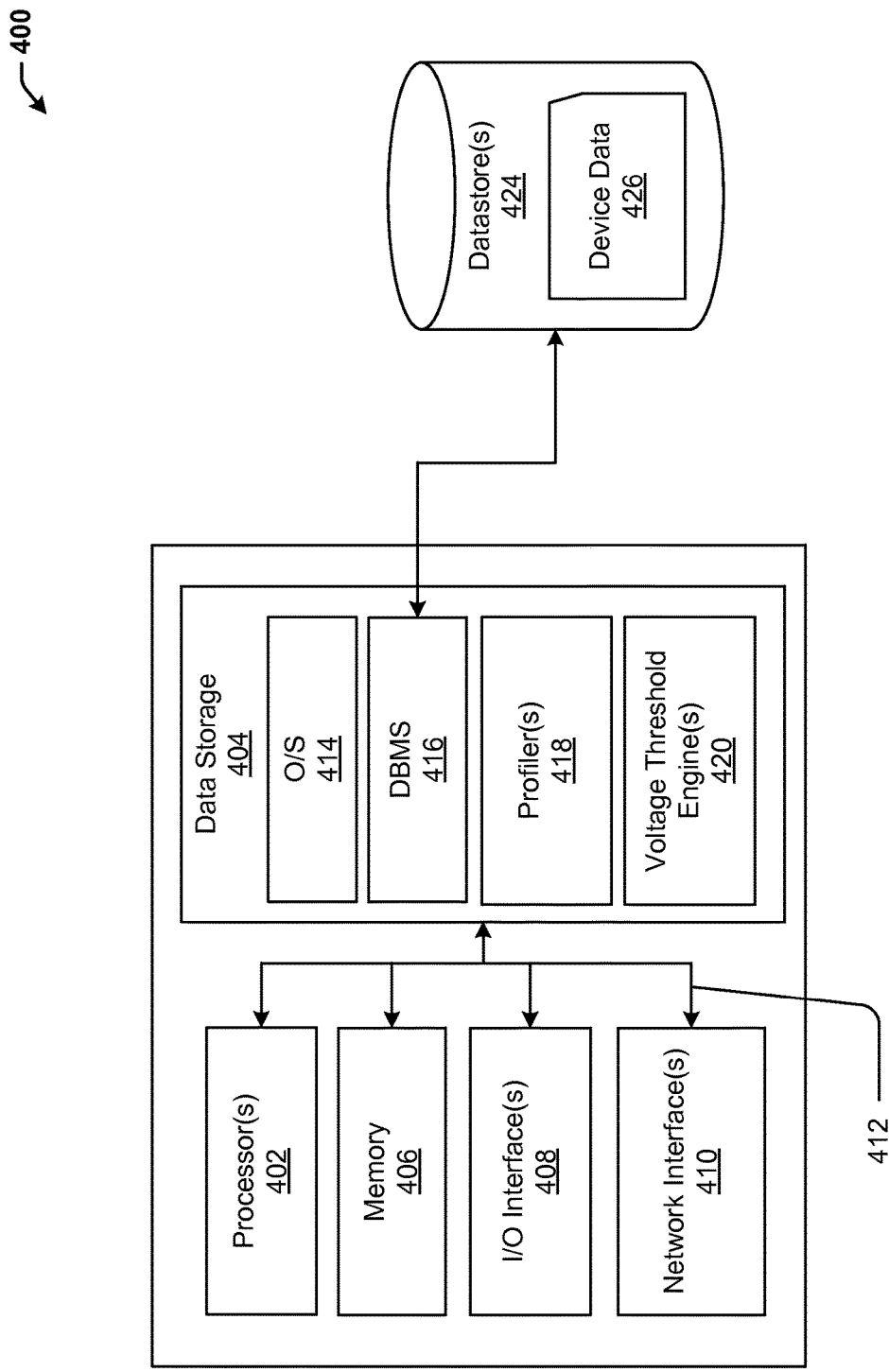
FIG. 4 is a schematic block diagram of an illustrative user device in accordance with one or more example embodiments of the disclosure.

FIG. 4 is a schematic block diagram of an illustrative user device 400 that may be used to perform any of the data processing and user device configuration described herein in accordance with one or more example embodiments of the disclosure. In an illustrative configuration, the user device 400 may include one or more processors (processor(s)) 402, one or more memory devices 406 (generically referred to herein as memory 406), one or more input/output ("I/O") interface(s) 408, one or more network interfaces 410, and data storage 404. The user device 400 may further include one or more buses 412 that functionally couple various components of the user device 400. In certain example embodiments, the user device 400 may be a mobile device that may include one or more antennas (not shown) including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 412 may include at least one of a system bus, a memory bus, an address bus, or a message bus, and may permit the exchange of information (e.g., data (including computer-executable code), signaling, etc.) between various components of the user device 400. The bus(es) 412 may include, without limitation, a memory bus or a memory controller, a peripheral bus, an accelerated graphics port, and so forth. The bus(es) 412 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 406 of the user device 400 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 406 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 406 may include main memory (e.g., memory directly accessible by the processor 402) as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 404 may include removable storage and/or non-removable storage including, but not limited to, magnetic storage, optical disk storage, solid-state storage, and/or tape storage. The data storage 404 may provide non-volatile storage of computer-executable instructions and other data. The memory 406 and the data storage 404, removable and/or non-removable, are examples of computer-readable storage media (CRSM) as that term is used herein.

The data storage 404 may store computer-executable code, instructions, or the like that may be loadable into the memory 406 and executable by the processor(s) 402 to cause the processor(s) 402 to perform or initiate various operations. The data storage 404 may additionally store data that may be copied to the memory 406 for use by the processor(s) 402 during the execution of the computer-executable instructions. Moreover, output data generated as a result of execution of the computer-executable instructions by the processor(s) 402 may be stored initially in memory 406, and may ultimately be copied to data storage 404 for non-volatile storage.

More specifically, the data storage 404 may store one or more operating systems (O/S) 414; one or more database management systems (DBMS) 416; and one or more program modules, applications, or the like such as, for example, one or more profiler(s) 418 and/or one or more voltage threshold engine(s) 420. The data storage 404 may further store any of a variety of other types of modules. Further, any program modules stored in the data storage 404 may include one or more sub-modules. Further, any data stored in the data storage 404 may be loaded into the memory 406 for use by the processor(s) 402 in executing computer-executable code. In addition, any data potentially stored in one or more datastores 424 (e.g., device data 426) may be accessed via the DBMS 416 and loaded in the memory 406 for use by the processor(s) 402 in executing computer-executable code.

The processor(s) 402 may be configured to access the memory 406 and execute computer-executable instructions loaded therein. For example, the processor(s) 402 may be configured to execute computer-executable instructions of the various program modules of the user device 400 to cause or facilitate various operations to be performed in accordance with one or more embodiments of the disclosure. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to functionality supported by the various program modules depicted in FIG. 4, the profiler(s) 418 may include computer-executable instructions, code, or the like that, responsive to execution by one or more of the processor(s) 402, generates benchmark load metrics 106. In some embodiments, the profiler(s) 418 may be one or more applications with a known load profile (e.g., application with a predictable resource usage pattern) that, when executed, will utilize a known quantity of a resource (e.g., drawing an electrical current from the battery). Benchmark load metric(s) 106 may be generated by measuring the voltages associated with the components of the user device 400 during the execution of the profiler(s) 418. Benchmark load metric(s) 106 may be transmitted to the voltage threshold engine(s) 420 for further processing and/or may be transmitted to either the data storage 404 of the user device 400 or the datastore 424.

The voltage threshold engine(s) 420 may include computer-executable instructions, code, or the like that, responsive to execution by one or more of the processor(s) 402, may receive and/or retrieve the data generated by the profiler(s) 418 (e.g., benchmark load metric(s) 106) and calculate a change value 108. In some embodiments, the change value 108 may be calculated by measuring the series resistance between the battery 220 and the PMIC 205. In some embodiments, the change value 108 may be calculated by computing the difference between the voltage of the battery 220 and a system voltage measured by the PMIC 205. Additionally, the change value 108 may be evaluated to determine whether it exceeds a maximum threshold. If the change value 108 does not exceed the maximum threshold, the system minimum voltage threshold may be adjusted to extend the battery life of the user device 400.

Referring now to other illustrative components depicted as being stored in the data storage 404, the O/S 414 may be loaded from the data storage 404 into the memory 406 and may provide an interface between other application software executing on the user device 400 and the hardware resources of the user device 400. More specifically, the O/S 414 may include a set of computer-executable instructions for managing the hardware resources of the user device 400 and for providing common services to other application programs (e.g., managing memory allocation among various application programs). The O/S 414 may include any operating system now known or which may be developed in the future including, but not limited to, any server operating system, any mainframe operating system, or any other proprietary or non-proprietary operating system.

The DBMS 416 may be loaded into the memory 406 and may support functionality for accessing, retrieving, storing, and/or manipulating data stored in the memory 406, data stored in the data storage 404, and/or data stored in the one or more datastores 424. The DBMS 416 may use any of a variety of database models (e.g., relational model, object model, etc.) and may support any of a variety of query languages. The DBMS 416 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the user device 400 is a mobile device, the DBMS 416 may be any suitable light-weight DBMS optimized for performance on a mobile device. Referring to the example types of data depicted as being stored in the datastore(s) 424, the device data 426 may include any data (e.g., benchmark load metrics 106) generated as a result of any of the processing described herein. It should be appreciated that "data," as that term is used herein, includes computer-executable instructions, code, or the like.

Referring now to other illustrative components of the user device 400, the one or more input/output (I/O) interfaces 408 may facilitate the receipt of input information by the user device 400 from one or more I/O devices as well as the output of information from the user device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the user device 400 or may be separate. The I/O devices may further include, for example, any number of peripheral devices such as data storage devices, printing devices, and so forth.

The I/O interface(s) 408 may also include an interface for an external peripheral device connection such as universal serial bus (USB), FireWire, Thunderbolt, Ethernet port or other connection protocol that may connect to one or more networks. The I/O interface(s) 408 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 400 may further include one or more network interfaces 410 via which the user device 400 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The user device 400 may be provided with antenna(s) (not shown), which may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers or radio components (not shown) to which or from which signals may be transmitted or received.

It should be appreciated that the program modules, applications, computer-executable instructions, code, or the like depicted in FIG. 4 as being stored in the data storage 404 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the user device 400, and/or hosted on other computing device(s) accessible via one or more networks, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the user device 400 may include alternate and/or additional hardware, software, or firmware components beyond those described or depicted without departing from the scope of the disclosure. More particularly, it should be appreciated that software, firmware, or hardware components depicted as forming part of the user device 400 are merely illustrative and that some components may not be present or additional components may be provided in various embodiments. While various illustrative program modules have been depicted and described as software modules stored in data storage 404, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the method 300 may have been described above as being performed by one or more components of the user device 400, or more specifically, by one or more program modules executing on such a user device 400. It should be appreciated, however, that any of the operations of the method 300 may be performed, at least in part, in a distributed manner by one or more other devices or systems, or more specifically, by one or more program modules, applications, or the like executing on such devices.

In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of any of the method 300 may be described in the context of the illustrative user device 400, it should be appreciated that such operations may be implemented in connection with numerous other system configurations.

The operations described and depicted in the illustrative methods of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   initiating, by a power management integrated circuit (PMIC) of a user device, a profiler application, wherein the profiler application draws a pre-set current from a battery of the user device;
   measuring, by an analog to digital converter (ADC) of the PMIC, a system voltage value and a battery voltage value when the profiler application draws the pre-set current from the battery;
   retrieving, by the PMIC, a system minimum voltage threshold value and a system minimum voltage value associated with the user device, wherein the system minimum voltage value is indicative of the voltage required to power the user device and the system minimum voltage threshold value is indicative of the lowest system minimum voltage value the user device is capable of reaching;
   calculating, by the PMIC, a change value by subtracting the system voltage value from the battery voltage value;
   generating, by the PMIC, a temporary value by subtracting the change value from a system minimum voltage value of the user device;
   determining, by the PMIC, that the temporary value is not lower than the system minimum voltage threshold value; and
   decreasing, by the PMIC, the system minimum voltage value by the change value.

2. The method of claim 1, further comprising:
   initiating, by the PMIC, the profiler application at fixed intervals.

3. The method of claim 1, further comprising:
   identifying, by the PMIC, a first voltage value for a WiFi amplifier component of the user device and a second voltage value for a touch screen controller of the user device;
   determining, by the PMIC, that the first voltage value is greater than the second voltage value; and
   updating, by the PMIC, the system minimum voltage threshold value using the first voltage value.

4. The method of claim 1, wherein calculating the change value based on the system voltage and the battery voltage further comprises:
   determining, by the PMIC, that the temporary value is lower than the system minimum voltage threshold value;
   updating, by the PMIC, the change value to zero; and
   generating, by the PMIC, a notification indicating that further battery life extension is not possible.

5. A method, comprising:
   executing, by a computer processor of a user device, a profiler application;
   generating, by the computer processor, a set of benchmark load metrics by measuring a system voltage value and a battery voltage value from a power management integrated circuit (PMIC) when the profiler application is executed;
   retrieving, by the computer processor, a system minimum voltage value, wherein the system minimum voltage value is indicative of a minimum voltage required to power the user device;
   determining, by the computer processor, a change value by subtracting the system voltage value from the battery voltage value; and
   adjusting, by the computer processor, the system minimum voltage value by decreasing the system minimum voltage value by the change value.

6. The method of claim 5, further comprising:
   retrieving, by the computer processor, a second set of benchmark load metrics comprising a second system voltage value and a second battery voltage value;
   calculating, by the computer processor, a second change value by computing the difference between the second system voltage value and the second battery voltage value;
   determining, by the computer processor, that the change value and the second change value are the same; and
   updating, by the computer processor, the change value to zero.

7. The method of claim 5, further comprising:
   determining, by the computer processor, that a period of time has elapsed from the date of manufacture of the user device; and
   generating, by the computer processor, the set of benchmark load metrics at periodic intervals.

8. The method of claim 6, further comprising:
   retrieving, by the computer processor, a third set of benchmark load metrics comprising a third system voltage value and a third battery voltage value;

calculating, by the computer processor, a first temporary value of the difference between the system voltage value and the third system voltage value; and calculating, by the computer processor, a second temporary value of the difference between the battery voltage value and the third battery voltage value.

9. The method of claim 8, further comprising:

determining, by the computer processor, that the first temporary value and the second temporary value do not exceed a change threshold; and modifying, by the computer processor, a periodic time interval for generating the benchmark load metrics by increasing a value of the periodic time interval.

10. The method of claim 8, further comprising:

determining, by the computer processor, that the first temporary value and the second temporary value exceed a change threshold; and modifying, by the computer processor, a periodic time interval for generating the benchmark load metrics by decreasing a value of the periodic time interval.

11. The method of claim 5, further comprising:

retrieving, by the computer processor, a plurality of voltage values, each of the voltage values corresponding to a peripheral component of a user device;

identifying, by the computer processor, a first voltage value of the plurality of voltage values that has a highest value; and generating, by the computer processor, a system minimum voltage threshold value using the first voltage value.

12. The method of claim 11, further comprising:

generating, by the computer processor, a temporary value by calculating the difference between the system minimum voltage value and the change value;

determining, by the computer processor, that the temporary value is less than the system minimum voltage threshold value; and updating, by the computer processor, the change value to zero.

13. The method of claim 5, wherein the profiler application draws a pre-set current from a battery of the user device.

14. The method of claim 5, further comprising:

retrieving, by the computer processor, a system minimum voltage threshold value;

calculating, by the computer processor, a temporary value by subtracting the change value from the system minimum voltage value;

determining, by the computer processor, that the temporary value is less than the system minimum voltage threshold value;

updating, by the computer processor, the change value to zero; and facilitating, by the computer processor, a message indicating a battery of the user device cannot be extended further.

15. A system, comprising: a power management integrated circuit (PMIC) configured to: generate a set of benchmark load metrics comprising a system voltage value and a battery voltage value of a user device; a memory storing computer-executable instructions; and a processor configured to access the memory and execute the computer-executable instructions to: obtain the set of benchmark load metrics from the PMIC; retrieve a system minimum voltage value associated with the user device, wherein the system voltage value is indicative of a minimum voltage to power the user device; generate a change value by calculating a difference between the system voltage value and the battery voltage value; and modify the system minimum voltage value by subtracting the minimum system voltage value by the change value.

16. The system of claim 15, wherein the PMIC is further configured to:

generate the benchmark load metrics using a load profiler application; and store the benchmark load data.

17. The system of claim 15, wherein the PMIC is further configured to:

determine that a period of time has elapsed from the date of manufacture of the user device; and generate the set of benchmark load metrics.

18. The system of claim 15, wherein the processor is further configured to:

determine a plurality of voltage values, each of the voltage values corresponding to a respective peripheral component of the user device;

identify a voltage value of the plurality of voltage values that has a highest value; and generate a system minimum voltage threshold value using the voltage value.

19. The system of claim 18, wherein the processor is further configured to:

generate a temporary value by calculating the difference between the system minimum voltage value and the change value;

determine that the temporary value is less than the system minimum voltage threshold value; and update the change value to zero.

20. The system of claim 15, wherein the processor is further configured to:

retrieve a system minimum voltage threshold value of the user device;

calculate a temporary value by subtracting the change value from the system minimum voltage value;

determine that the temporary value is less than the system minimum voltage threshold value;

update the change value to zero; and facilitate presentation of a notification indicating a battery of the user device cannot be extended further.

* * * * *